(12) United States Patent
Pinto, IV et al.

(10) Patent No.: US 8,677,550 B2
(45) Date of Patent: Mar. 25, 2014

(54) VEHICLE WIPER BLADE INCLUDING ACTIVE MATERIAL DE-ICER

(75) Inventors: Nicholas W. Pinto, IV, Ferndale, MI (US); Scott R. Webb, Macomb Township, MI (US); Paul W. Alexander, Ypsilanti, MI (US); Alan L. Browne, Grosse Pointe, MI (US); Nancy L. Johnson, Northville, MI (US); Wendell G. Summerville, Birmingham, MI (US); John A. Cafeo, Farmington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 202 days.

(21) Appl. No.: 13/167,085

(22) Filed: Jun. 23, 2011

(65) Prior Publication Data

US 2012/0324672 A1    Dec. 27, 2012

(51) Int. Cl.
*B60S 1/32* (2006.01)

(52) U.S. Cl.
USPC .................. 15/250.19; 15/250.23; 15/250.48; 15/250.43

(58) Field of Classification Search
USPC ............... 15/250.48, 250.43, 250.44, 250.32, 15/250.361, 250.16, 250.17, 250.001, 15/250.19, 250.202, 250.203, 250.23, 15/250.28, 250.451
See application file for complete search history.

(56) References Cited

U.S. PATENT DOCUMENTS

| | | | | | |
|---|---|---|---|---|---|
| 3,108,307 | A | * | 10/1963 | Redrow | 15/250.203 |
| 4,180,886 | A | * | 1/1980 | Scherz | 15/250.04 |
| 5,062,175 | A | * | 11/1991 | Buchanan et al. | 15/250.203 |
| 5,070,571 | A | * | 12/1991 | Arai | 15/250.001 |
| 5,325,564 | A | * | 7/1994 | Swanepoel | 15/250.44 |
| 6,129,093 | A | * | 10/2000 | Kelly | 134/6 |
| 6,743,298 | B2 | * | 6/2004 | Schmid | 134/6 |
| 6,915,633 | B2 | * | 7/2005 | Kutlucinar | 60/527 |
| 2007/0022558 | A1 | * | 2/2007 | Petkov et al. | 15/250.361 |
| 2008/0034531 | A1 | * | 2/2008 | Beaver | 15/250.361 |
| 2009/0072575 | A1 | * | 3/2009 | Browne et al. | 296/97.7 |

FOREIGN PATENT DOCUMENTS

| | | | | | |
|---|---|---|---|---|---|
| EP | 0930207 | A2 | * | 7/1999 | B60S 1/02 |
| EP | 1493641 | A2 | * | 5/2005 | B60S 1/06 |

OTHER PUBLICATIONS

EP0930207A2 (machine translation), 1999.*

* cited by examiner

*Primary Examiner* — Mark Spisich
*Assistant Examiner* — Andrew A Horton
(74) *Attorney, Agent, or Firm* — Quinn Law Group, PLLC

(57) ABSTRACT

A wiper assembly includes a wiper blade having a length and an active material actuator provided along a portion of the length of the wiper blade and coupled thereto. The active material actuator is configured to impart a degree of motion to a portion of the wiper blade in response to an electrical actuation signal.

8 Claims, 2 Drawing Sheets

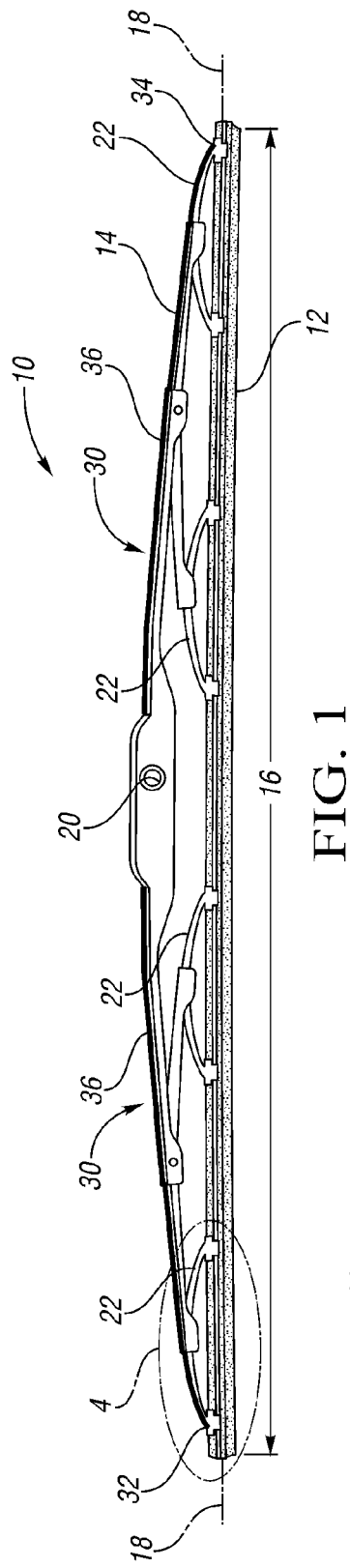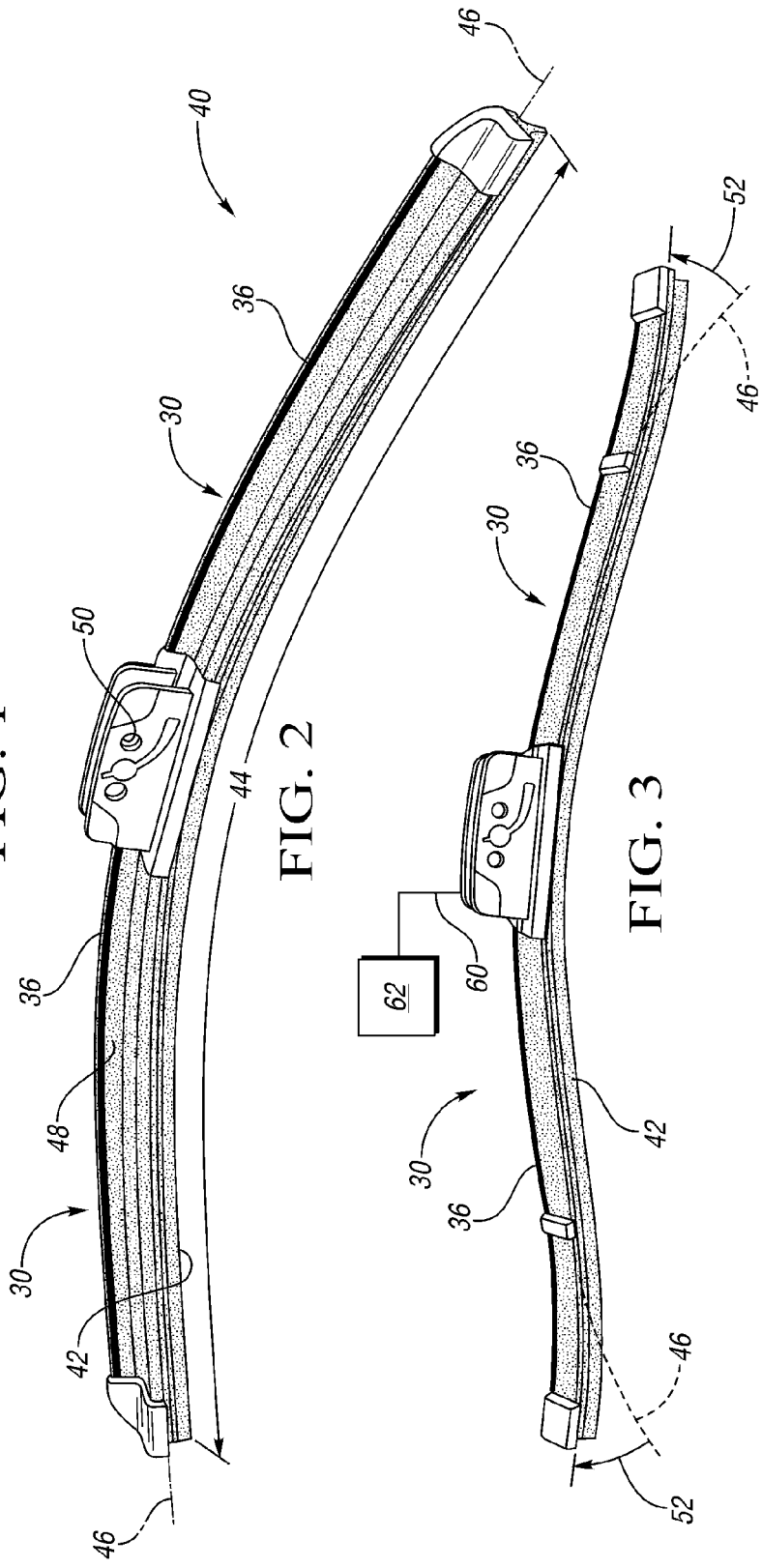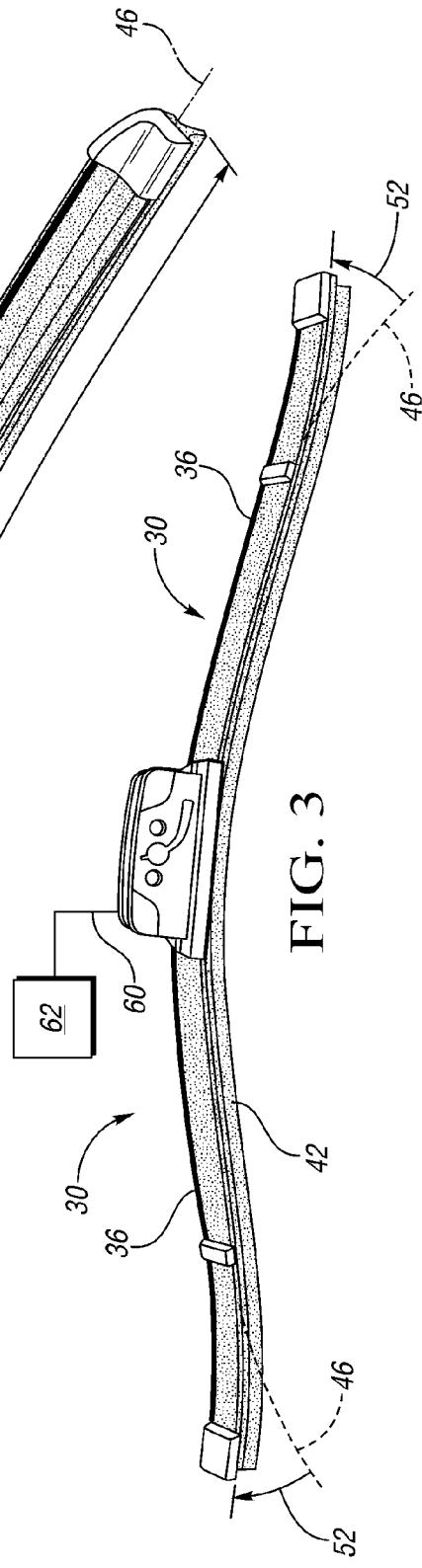
FIG. 1
FIG. 2
FIG. 3

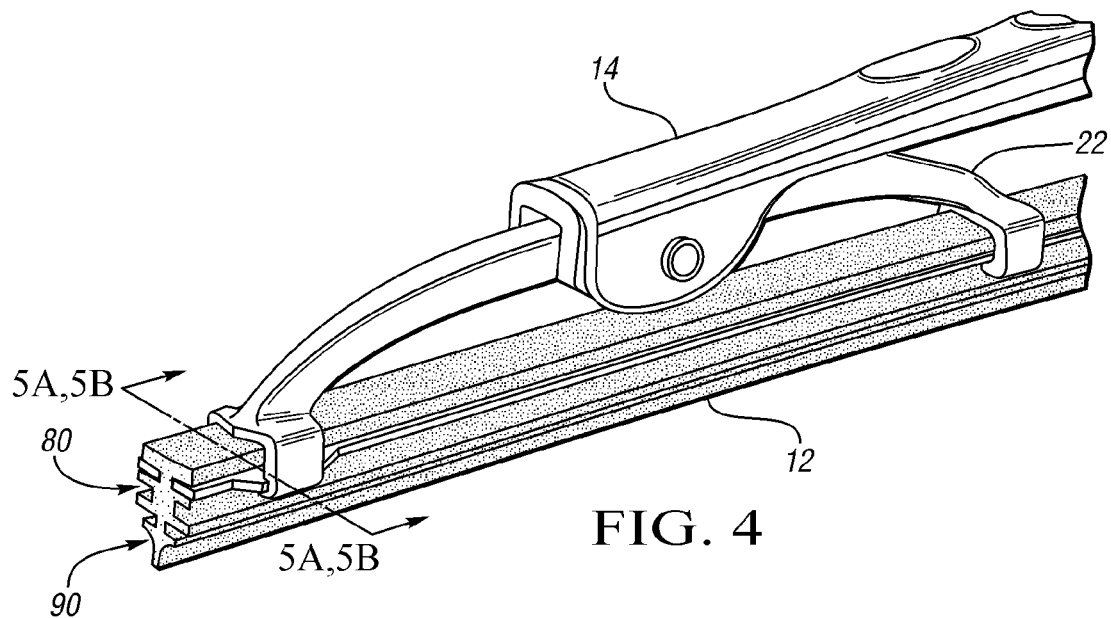
FIG. 4
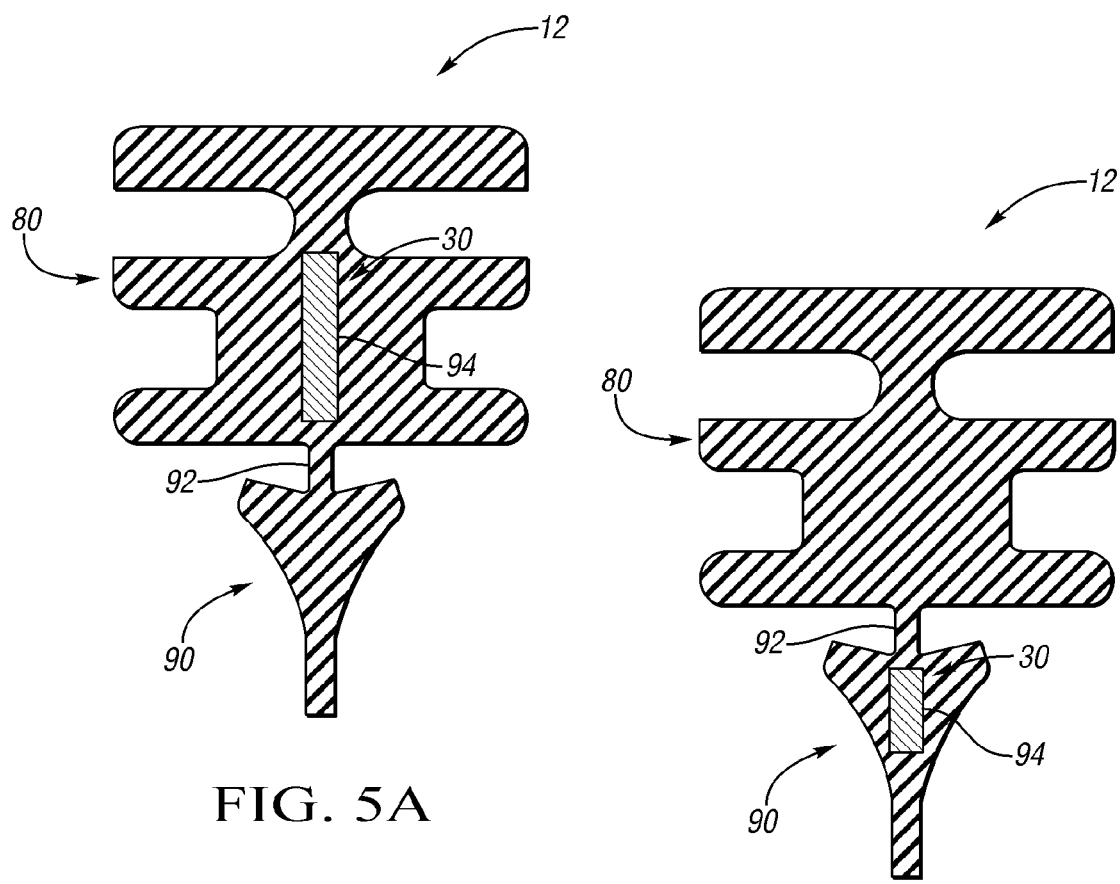
FIG. 5A
FIG. 5B

VEHICLE WIPER BLADE INCLUDING ACTIVE MATERIAL DE-ICER

TECHNICAL FIELD

The present invention relates to vehicle wiper blade assemblies.

BACKGROUND

A vehicle wiper assembly is a device used to remove liquid, such as rain, and/or debris from the surface of a vehicle window. Often wiper assemblies are used in conjunction with the front windshield/windscreen of the vehicle and/or a rear window of the vehicle. Vehicles that may employ the use of wiper assemblies may include, for example, automobiles, trains, aircrafts and watercrafts.

A wiper assembly may generally include a long wiper blade that is swung back and forth over the surface of the glass to push water from its surface. The speed is normally adjustable, with several continuous speeds and often one or more "intermittent" settings. Also, the blade may be adapted to conform to any varying curvature that may be present along the surface of the window.

During inclement weather, especially in colder climates, rain or melted snow may accumulate on the wiper blade, where it may freeze to ice. Accumulated ice may detract from the blade's ability to conform to a varying surface curvature or wiping ability.

SUMMARY

A vehicle wiper assembly includes a wiper blade having a length, and an active material actuator provided along a portion of the length of the wiper blade and coupled thereto. The active material actuator is configured to impart a degree of motion to a portion of the wiper blade in response to an electrical actuation signal. In an embodiment, the active material actuator may include a shape memory alloy material with a crystallographic phase that is changeable between austenite and martensite in response to the electric actuation signal. Such a phase change may cause a corresponding expansion or contraction of the shape memory alloy that may deflect a portion of the wiper blade away from an initial longitudinal axis of the blade. Additionally, the wiper assembly may include a biasing feature configured to urge the wiper blade toward the initial longitudinal axis.

The wiper assembly may further include a wiper blade frame coupled to the wiper blade, where the active material actuator is integrated into the wiper blade frame. Alternatively, the wiper blade may be a frameless wiper blade that includes a spine provided along the length of the wiper blade, with the active material actuator being integrated into the spine.

In another embodiment, the active material actuator may include a piezoelectric element, where the imparted degree of motion is a vibration. The wiper blade may include a base portion and a wiper portion, where the piezoelectric element may be embedded into either portion.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a side view of a vehicle wiper assembly including an active material actuator.

FIG. 2 is a perspective view of a frameless wiper assembly including an active material actuator.

FIG. 3 is a side view of the frameless wiper assembly of FIG. 2, shown in an actuated state.

FIG. 4 is a perspective view of a portion of the vehicle wiper assembly.

FIG. 5A is a cross-sectional schematic view of an embodiment of a wiper blade having a piezoelectric actuator.

FIG. 5B is a cross-sectional schematic view of an embodiment of a wiper blade having a piezoelectric actuator.

DETAILED DESCRIPTION

Referring to the drawings, wherein like reference numerals are used to identify like or identical components in the various views, FIG. 1 illustrates an embodiment of a wiper assembly 10 that includes a wiper blade 12 and a wiper blade frame 14. The wiper blade 10 may generally have a length 16, which may be measured substantially along a longitudinal axis 18 of the blade 12. The wiper assembly 10 may be similar in general construction to standard wiper assemblies that are commonly used in automotive applications to remove liquid from the surface of a window of the automotive vehicle.

In operation, the blade portion 12 of the assembly 10 may contact the outer surface of the window (not shown), and may wipe in a generally lateral direction (i.e., transverse to the longitudinal axis 18) to push the water off of the window. Commonly, the entire assembly 10 may be articulated in an arc-shaped manner by a rotor disposed away from the assembly. The rotor may be coupled to the wiper assembly 10, for example, via an armature that may be connected at an attachment point 20 on the assembly 10. In an embodiment, the wiper blade frame 14 may have a plurality of spring or biasing features 22 that may apply a contact force to various points along the length 16 of the wiper blade 12. During operation, the various contact forces provided by the spring features 22 may ensure that a generally uniform pressure is maintained between the wiper blade 12 and the adjacent window. If the window has a varying surface curvature, the contact forces applied by the spring features 22 may cause the wiper blade 12 to elastically deform during the wiping action to match the curvature of the window. This spring-forced elastic deformation of the wiper blade 12 may be sufficient to provide a uniform contact pressure between the blade 12 and the window, despite changing curvature.

FIG. 2 illustrates an embodiment of a wiper assembly 40 that includes a wiper blade 42 having a length 44, which may generally be measured along a longitudinal axis 46. The wiper assembly 40 provided in FIG. 2, however, substitutes a pressure applying spine 48 for the wiper blade frame 14 illustrated in FIG. 1. The spine 48 of the frameless wiper assembly 40 may extend along substantially the entire length 44 of the blade 42. The spine 48 may be made from a material that is capable of maintaining an elastic strain, and may apply a contact force against the entire length of the wiper blade 42. The frameless wiper assembly 40 may further include an attachment point 50 along the length of the wiper blade 42 that may indirectly couple with a remote actuator to cause the assembly 40 to laterally sweep across a window surface.

Referring again to FIG. 1, an active material actuator (generally at 30) may be provided with the wiper assembly 10 along a portion of the length 16 of the wiper blade 12. The active material actuator 30 may be coupled to the wiper blade 12 in one or more positions, either directly, or through the wiper blade frame 14. For example, the active material actuator 30 may be coupled to the wiper blade 12 via connection points 32, 34, generally located at opposite ends of the blade 12. The active material actuator 30 may be configured to impart a degree of motion to a portion of the wiper blade 12 in response to an electrical actuation signal. For example, in one embodiment, the active material actuator 30 may be a shape memory alloy material 36 that may be configured to deflect a portion of the wiper blade 12 away from the initial longitudinal axis 18. In another embodiment, which will be discussed in more detail below, the active material actuator 30 may be a piezoelectric element configured to impart a vibration to the wiper blade 12.

As used herein, the terminology "shape memory alloy" (often abbreviated as "SMA") refers to alloys which exhibit a shape memory effect. That is, the shape memory alloy material 36 may undergo a solid state, crystallographic phase change to shift between a martensite phase, i.e., "martensite", and an austenite phase, i.e., "austenite." Alternatively stated, the shape memory alloy material 36 may undergo a displacive transformation rather than a diffusional transformation to shift between martensite and austenite. A displacive transformation is a structural change that occurs by the coordinated movement of atoms (or groups of atoms) relative to their neighbors. In general, the martensite phase refers to the comparatively lower-temperature phase and is often more deformable than the comparatively higher-temperature austenite phase.

The temperature at which the shape memory alloy material 36 begins to change from the austenite phase to the martensite phase is known as the martensite start temperature, $M_s$. The temperature at which the shape memory alloy material 36 completes the change from the austenite phase to the martensite phase is known as the martensite finish temperature, $M_f$. Similarly, as the shape memory alloy material 36 is heated, the temperature at which the shape memory alloy material 36 begins to change from the martensite phase to the austenite phase is known as the austenite start temperature, $A_s$. The temperature at which the shape memory alloy material 36 completes the change from the martensite phase to the austenite phase is known as the austenite finish temperature, $A_f$.

Therefore, the shape memory alloy material 36 may be characterized by a cold state, i.e., when a temperature of the shape memory alloy material 36 is below the martensite finish temperature $M_f$ of the shape memory alloy material 36. Likewise, the shape memory alloy material 36 may also be characterized by a hot state, i.e., when the temperature of the shape memory alloy material 36 is above the austenite finish temperature $A_f$ of the shape memory alloy material 36.

In operation, shape memory alloy material 36 that is pre-strained or subjected to tensile stress can change dimension upon changing crystallographic phase to thereby convert thermal energy to mechanical energy. That is, the shape memory alloy material 36 may change crystallographic phase from martensite to austenite and thereby dimensionally contract if pseudoplastically pre-strained so as to convert thermal energy to mechanical energy. Conversely, the shape memory alloy material 36 may change crystallographic phase from austenite to martensite and if under stress thereby dimensionally expand so as to also convert thermal energy to mechanical energy.

Pseudoplastically pre-strained refers to stretching of the shape memory alloy material 36 while in the martensite phase so that the strain exhibited by the shape memory alloy material 36 under that loading condition is not fully recovered when unloaded, where purely elastic strain would be fully recovered. In the case of the shape memory alloy material 36, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed. However, when heated to the point that the shape memory alloy material 36 transforms to its austenite phase, that strain can be recovered, returning the shape memory alloy material 36 to the original length observed prior to application of the load.

The shape memory alloy material 36 may be stretched before installation into the wiper assembly 10, 40, such that a nominal length of the shape memory alloy material 36 includes recoverable pseudoplastic strain. Alternating between the pseudoplastic deformation state (relatively long length) and the fully-recovered austenite phase (relatively short length) may apply a force to the wiper blade 12, 42 that may cause the blade 12, 42 to deform a distance 52 away from the initial longitudinal axis 18, 46, such as generally illustrated in FIG. 3. Additionally, or alternatively, the psuedoplastic strain recovery may cause a portion of the blade 12, 42 to twist about the longitudinal axis 18, 46, such as, for example, by pulling on a portion of the blade in an off-axis arrangement.

The shape memory alloy material 36 may change both modulus and dimension upon changing crystallographic phase to thereby convert thermal energy to mechanical energy. More specifically, the shape memory alloy material 36, if pseudoplastically pre-strained, may dimensionally contract upon changing crystallographic phase from martensite to austenite and may dimensionally expand, if under tensile stress, upon changing crystallographic phase from austenite to martensite to thereby convert thermal energy to mechanical energy. Therefore, if the shape memory alloy material 36 is resistively heated via an electrical actuation signal 60, it may dimensionally contract upon changing crystallographic phase between martensite and austenite.

The shape memory alloy material 36 may have any suitable composition. In particular, the shape memory alloy material 36 may include an element selected from the group including, without limitation: cobalt, nickel, titanium, indium, manganese, iron, palladium, zinc, copper, silver, gold, cadmium, tin, silicon, platinum, gallium, and combinations thereof. For example, and without limitation, suitable shape memory alloys 36 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof.

The shape memory alloy material 36 can be binary, ternary, or any higher order so long as the shape memory alloy material 36 exhibits a shape memory effect, i.e., a change in shape orientation, damping capacity, and the like. The specific shape memory alloy material 36 may be selected according to expected operating temperatures that the wiper assembly 10, 40 will be used with. In one specific example, the shape memory alloy material 36 may include nickel and titanium.

In the frameless wiper assembly 40, such as shown in FIGS. 2 and 3, the active material actuator 30 may be incorporated within the spine 48, and in such a manner that actuation of the actuator 30 may cause the wiper blade 42 to deflect away from the initial longitudinal axis 46 as demonstrated in FIG. 3. Upon being provided with an electrical actuation signal 60, for example, by a controller 62, the active material actuator 30 may impart a degree of motion to the wiper blade 42 by causing the shape memory alloy 36 to transition to an austenite phase, where it may contract and deflect the wiper blade 42.

The controller 62 may be embodied, as a server or a host machine, i.e., one or multiple digital computers or data processing devices, each having one or more microprocessors or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, and any required input/output (I/O) circuitry and devices, as well as signal conditioning and buffering electronics. In an embodiment, the controller 62 may include such power electronic components that may be necessary to generate an electrical actuation signal 60 capable of, for example, resistively heating the shape memory alloy material 36.

While shown as a single device in FIG. 3 for simplicity and clarity, the various elements the controller 62 may be distributed over as many different hardware and software components as are required to optimally control the active material actuator 30. The individual control routines/systems resident in the controller 62 or readily accessible thereby may be stored in ROM or other suitable tangible memory location and/or memory device, and automatically executed by associated hardware components of the controller 62 to provide the respective control functionality.

In an embodiment, the act of deflecting and/or twisting may be performed with sufficient force to crack/break away a reasonable amount of ice that may have collected on the blade 42 or wiper assembly 40 due to inclement weather conditions. Either at the prompting of the vehicle operator, or at the control of an ice or temperature sensor, the controller 62 may provide the active material actuator 30 with an electrical actuation signal 60 that may, for example, resistively heat the shape memory alloy 36 component of the active material actuator 30 to a point where an austenitic phase transformation occurs. This phase transformation may result in a reduction in the length of the actuator 30, thus causing the ends of the wiper blade 42 to torque away from the window and deflect a measurable distance 52.

Upon the removal of the electrical actuation signal 60, the shape memory alloy 36 may cool, wherein it may transition back into a martensitic state. Once back in the martensitic state, the alloy 36 may reacquire its elastic properties to the extent where the blade 42 may be urged back to the initial longitudinal axis by the biasing characteristics of the spine 48 (or by the spring feature 22 in a wiper assembly 10 having a wiper frame 14).

FIG. 4 illustrates an enlarged perspective view of a portion of a vehicle wiper assembly 10, which may be similar to area 4 shown in FIG. 1. As can be seen in FIG. 4, and in the cross-sectional embodiments illustrated in FIGS. 5A and 5B, the wiper blade 12 may include a base portion 80 and a wiper portion 90. The base portion 80 may be configured to interconnect with the wiper frame 14, and may allow for quick decoupling from the frame 14 to allow for easy replacement or servicing. The wiper portion 90 may be flexibly interconnected to the base portion 80 through an interconnection member 92 which may generally maintain the wiper blade 12 in a centered, neutral position (as shown), though may allow it to articulate relative to the base portion 80. In an embodiment, each of the base portion 80, the wiper portion 90, and the interconnection member 92 may be made from a polymeric material. In an embodiment, the polymeric material may be an elastomer or rubber-like material.

As illustrated in both FIGS. 5A and 5B, in an embodiment, an active material actuator 30 may be embedded within the wiper blade 12, and may comprise a piezoelectric element 94. When an electric field is applied to the piezoelectric element 94, its dimensions may change due to a re-alignment of its atomic structure. If the field is alternated, the field may then impart a vibration to the element 94, and correspondingly to the wiper blade 12. In the embodiment illustrated in FIG. 5A, for example, the piezoelectric element 94 may be embedded in the base portion 80 of the wiper blade 12. Alternatively, as shown in FIG. 5B, the piezoelectric element 94 may be embedded within the wiper portion 90 of the wiper blade 12. As may be appreciated, the piezoelectric element 94 may be included in addition to the shape memory alloy material 36 described above, or may be used instead of the shape memory alloy material 36.

In an embodiment, the piezoelectric element 94 may extend along a portion of the length of the wiper blade 12. Such a configuration may involve a single piezoelectric element 94 extending up to the entire length of the wiper blade 12, or alternatively, it may comprise many smaller piezoelectric elements 94 disposed along the blade's length. If an electrical actuation signal, in the form of an alternating current field, is applied to the piezoelectric element 94, the element 94 may vibrate at the frequency of the field. During use, such a vibration may cause the blade 12 to dither as it traverses the vehicle window. Such a dithering action may reduce any potential stiction forces (i.e., also referred to as stick-slip friction) that may urge the blade to skip or hop across the window. Accordingly, the vibration/dithering action may ultimately result in a more consistent contact between the blade 12 and the window surface. Additionally, the vibration may act as a deterrent to ice accumulating on the blade during inclement weather conditions.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:

1. A wiper assembly comprising:
a wiper blade having a length and two opposing end portions, the length defining an initial longitudinal axis, wherein the wiper blade is configured to contact an adjacent surface across a substantial portion of the length, and wherein the wiper blade is a frameless wiper blade, the frameless wiper blade including a spine provided along the length of the wiper blade;
an active material actuator provided along a portion of the length of the wiper blade and coupled to the spine, the active material actuator configured to impart a degree of motion to a portion of the wiper blade in response to an actuation signal;
wherein the degree of motion includes a deflection of each of the two end portions of the wiper blade in a direction away from the adjacent surface, and away from the initial longitudinal axis;
wherein the active material actuator includes a shape memory alloy material with a crystallographic phase that is changeable between austenite and martensite in response to the electric actuation signal; and
wherein the phase change causes a corresponding expansion or contraction of the shape memory alloy.

2. The wiper assembly of claim 1, wherein the imparted degree of motion is a twisting of a portion of the wiper blade along the longitudinal axis.

3. The wiper assembly of claim 1, wherein the actuation signal is an electrical actuation signal.

4. The wiper assembly of claim 1, wherein the wiper blade further includes a central portion disposed between the two end portions; and
   wherein the central portion is configured to contact the adjacent surface as the end portions deflect in a direction away from the adjacent surface.

5. A wiper assembly comprising:
   a wiper blade having a length substantially aligned with an initial longitudinal axis and two opposing end portions, wherein the wiper blade is configured to contact an adjacent surface across a substantial portion of the length;
   an active material actuator provided along a portion of the length of the wiper blade and coupled thereto, the active material actuator configured to deflect a portion of the wiper blade away from the initial longitudinal axis in response to an electric actuation signal;
   wherein the deflection away from the initial longitudinal axis includes a deflection of each of the two end portions of the wiper blade in a direction away from the adjacent surface; and
   wherein the wiper blade is a frameless wiper blade, the frameless wiper blade including a spine provided along the length of the wiper blade; and
   wherein the active material actuator is integrated into the spine.

6. The wiper assembly of claim 5, wherein the initial longitudinal axis has a curvature.

7. The wiper assembly of claim 5, further comprising a biasing feature configured to urge the wiper blade toward the initial longitudinal axis.

8. The wiper assembly of claim 5, wherein the wiper blade further includes a central portion disposed between the two end portions; and
   wherein the central portion is configured to contact the adjacent surface as the end portions deflect in a direction away from the adjacent surface.

* * * * *